United States Patent [19] [11] 3,892,397
Nicholls [45] July 1, 1975

[54] TELESCOPIC SUSPENSION UNITS

[75] Inventor: Lawrence George Nicholls, Birmingham, England

[73] Assignee: Girling Limited, Birmingham, England

[22] Filed: Dec. 27, 1973

[21] Appl. No.: 428,853

[30] Foreign Application Priority Data
Jan. 4, 1973 United Kingdom.................. 644/73

[52] U.S. Cl.................. 267/8 R; 267/34; 267/61 R
[51] Int. Cl............................................ B60q 13/00
[58] Field of Search..................... 267/8 R, 34, 61 R

[56] References Cited
UNITED STATES PATENTS

| | | | |
|---|---|---|---|
| 2,902,274 | 9/1959 | McIntyre | 267/8 R |
| 3,163,411 | 12/1964 | Heckethorn | 267/8 R |
| 3,332,677 | 7/1967 | Long, Jr. | 267/34 |
| 3,347,541 | 10/1967 | Buccino | 267/34 |
| 3,385,589 | 5/1968 | Erdmann | 267/8 |

Primary Examiner—James B. Marbert
Attorney, Agent, or Firm—Scrivener Parker Scrivener and Clarke

[57] ABSTRACT

A flange member detachably secured on a monotube suspension unit for supporting an external coil spring has a tubular part which coaxially surrounds the tube and has an inturned flange at one end for abutting an end of the tube, under the force of the coil spring, to retain the flange member on the tube. A lug or recess on the inturned flange co-operates with a respective recess or projection of a rod guide within the tube to locate the flange member angularly.

Figure 3:
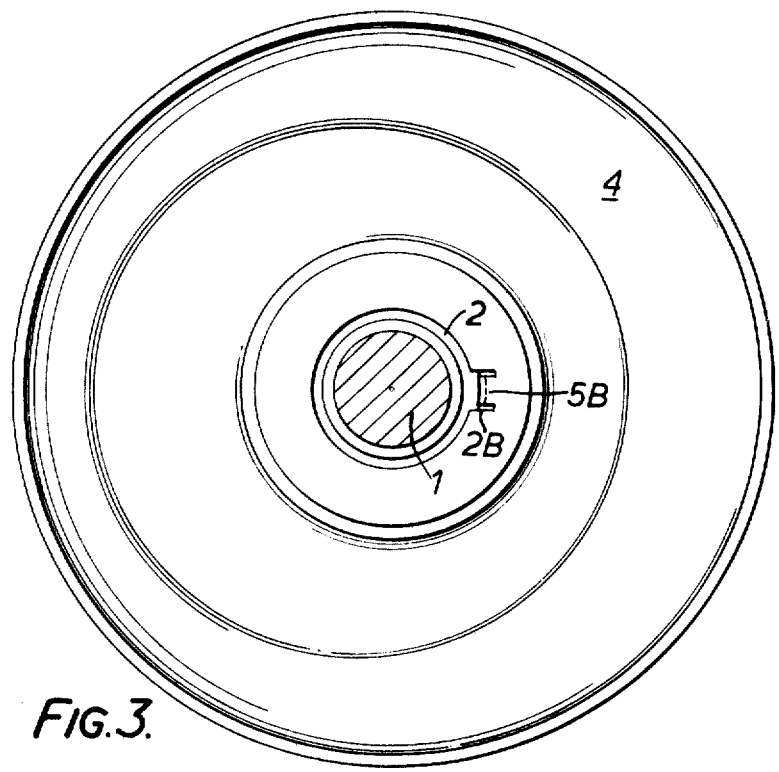

5 Claims, 4 Drawing Figures 3,892,397

TELESCOPIC SUSPENSION UNITS

This invention relates to telescopic suspension units and particularly to such units of the generally known form in which an abutment for an external, coil compression spring is provided in the form of a flange attached to the outer tube of the unit.

One well known form of unit to which the invention is applicable is the McPherson strut, in widespread use as a spring damper unit for a steerable road wheel in road vehicles.

In the known units of which we are presently aware, the spring abutment is constituted by a flange welded onto the outer tube of the unit.

In accordance with a feature of the present invention, however, the spring abutment is a flange member detachably mounted on an outer tube of the damper unit, preferably relying solely on the force of the spring which it supports to hold it in position in use.

Thus, we avoid the need to weld the abutment to the outer tube, with the result that deformation or damage to the tube by the welding operation is completely obviated.

In the presently preferred embodiments described below, the spring abutment is welded or otherwise integral with a tubular member which is mounted over the damper unit, and is axially movable relative thereto, the outer end of the tubular member being formed with an inturned flange which engages over the outer end of the outer tube of the damper thus limiting inward movement of the tubular member, relative to the damper, under the force of the compression spring supported in use by the abutment.

The term outer tube is used herein to denote the outer tube of a multi-tube damper and also the pressure tube of a monotube damper.

Figure 1:
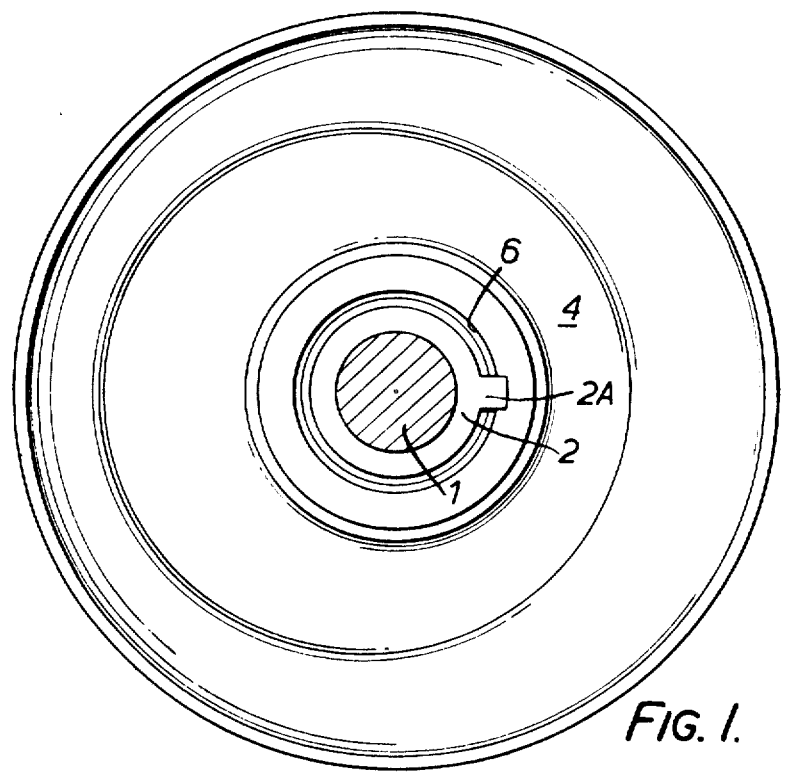
Figure 2:
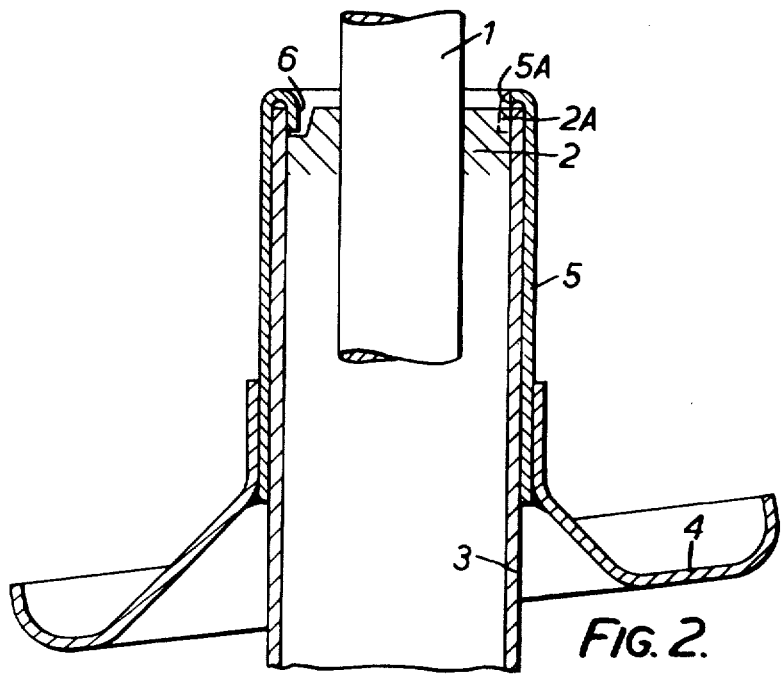
Figure 4:
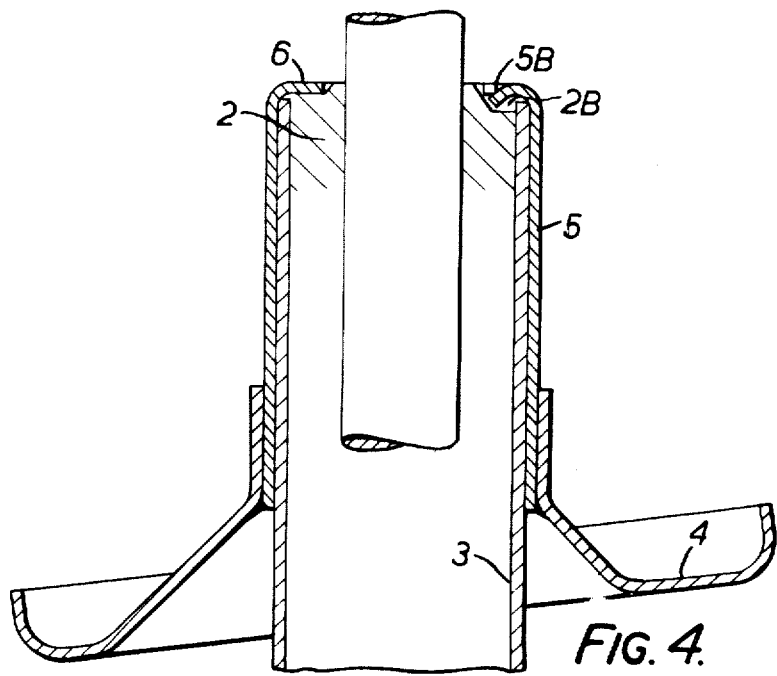

Two presently preferred embodiments of the invention will now be described by way of example, with reference to the accompanying drawings, in which:

FIGS. 1 and 2 are plan views and part axial section, respectively of one form of suspension unit in accordance with the invention; and FIGS. 3 and 4 are views, corresponding to FIGS. 1 and 2, of the second form.

In both illustrated embodiments there is shown, somewhat diagrammatically, the outer end (usually uppermost in use) of a telescopic suspension unit comprising a piston rod 1 extending through a rod-guide 2 secured in the end of an outer tube 3. A separate and detachable spring abutment is formed by a flange or "spring pan" 4 welded to one end of a tubular support 5 which is an easy sliding fit over the tube 3 and supports the flange on the tube intermediate the ends of the working space thereof, as shown. In each case the pan is inclined to the tube axis to suit the spring installation.

In FIGS. 1 and 2, rod guide 2 is set below the upper edge of tube 3, and the end of the tubular support 5 is turned in to form a re-entrant flange 6 engaged over the end of tube 3. The rod guide 2 is formed with a radial projection 2A which engages in a cut-out 5A to locate the pan 4 and support 5 angularly.

In FIGS. 3 and 4 the outer surface of the rod guide 2 and end of tube 3 are flush, and the flange 6 of tubular support 5 is simply turned in to overlie the rod-guide. In this case, the rod-guide is formed with a radial notch 2B and the flange with an integral, struck-out lug 5B engaging in the notch to provide the required angular location.

In both cases, welding of the spring abutment to the damper tube is avoided, the abutment simply being slid over the end of the damper tube and held in position, in the completed installation, by the coil spring which it supports.

Removal for servicing and or replacement is also facilitated by the nature of the releasable attachment of the spring abutment.

A further advantage of the invention is the ease with which the spring abutment can be selected from a range of abutments and readily assembled with a standarised damper unit to suit a particular installation.

What is claimed is:

1. A monotube suspension unit comprising a tube and an external flange member surrounding said tube for supporting one end of an external coil compression spring, and means for detachably mounting said flange member to said tube intermediate the ends of the working space thereof comprising stop means carried by said flange member in axially spaced relationship thereto, abutment means carried by said tube beyond one end of said working space and engageable by said stop means, said stop means and said abutment means being adapted to be held in engagement with each other to retain said flange member on said tube in its position of use by the force of the spring which said flange member supports.

2. A unit according to claim 1 wherein said flange member has a tubular portion co-axially slideable over said tube, said tubular portion having an inturned flange at one end constituting said stop means, said inturned flange being engagable with one end of said tube constituting said abutment means to locate said flange member axially.

3. A unit according to claim 2 wherein a rod guide is located in said outer tube, and said tubular portion and said rod guide are provided with co-operating engagement means to locate the flange member angularly on said tube.

4. A unit according to claim 3 wherein said inturned flange of said tubular portion has a lug and said rod guide has a recess, said lug engaging in said recess to locate said flange member angularly.

5. A unit according to claim 3 wherein said inturned flange of the tubular portion has a recess and said rod guide has a projection which engages in said recess to locate said flange member angularly.

* * * * *